United States Patent [19]
Bui et al.

[11] Patent Number: 5,554,212
[45] Date of Patent: Sep. 10, 1996

[54] WATERFAST HIGH GLOSS HYPERTHERMOGELLING AQUEOUS PHASE CHANGE INK AND METHOD FOR USE

[75] Inventors: Loc V. Bui, Beaverton; Clifford R. King, Salem; Donald R. Titterington, Tualatin; Bhalchandra M. Karandikar, Lake Oswego, all of Oreg.

[73] Assignee: Tektronix, Inc., Wilsonville, Oreg.

[21] Appl. No.: 550,062

[22] Filed: Oct. 30, 1995

Related U.S. Application Data

[63] Continuation-in-part of Ser. No. 239,105, May 6, 1994, Pat. No. 5,462,591.

[51] Int. Cl.⁶ .................................................. C09D 11/02
[52] U.S. Cl. .................. 106/20 R; 106/26 R; 106/22 F; 106/23 F; 106/22 H; 106/23 H
[58] Field of Search .............. 106/20 R, 26 R, 106/22 F, 23 F, 22 H, 23 H

[56] References Cited

U.S. PATENT DOCUMENTS

| | | | |
|---|---|---|---|
| 4,072,644 | 2/1978 | Hedrick | 260/29.6 |
| 4,137,083 | 1/1979 | Hedrick | 106/20 |
| 4,222,740 | 9/1980 | Bohrn et al. | 8/448 |
| 4,308,061 | 12/1981 | Iwahashi et al. | 106/22 H |
| 4,321,870 | 3/1982 | Zasloff | 101/473 |
| 4,454,279 | 6/1984 | Ong et al. | 524/376 |
| 4,474,751 | 10/1984 | Haslam et al. | 424/78 |
| 4,508,570 | 4/1985 | Fujii et al. | 106/20 D |
| 4,523,922 | 6/1985 | Ong et al. | 8/471 |
| 4,671,691 | 6/1987 | Case et al. | 401/142 |
| 4,851,393 | 7/1989 | Rha et al. | 514/54 |
| 4,908,063 | 3/1990 | Baker et al. | 106/31 |
| 4,923,515 | 5/1990 | Koike et al. | 106/22 |
| 4,938,801 | 7/1990 | Yoshioka et al. | 106/27 |
| 4,963,188 | 10/1990 | Parker | 106/20 |
| 5,008,108 | 4/1991 | Rha et al. | 424/401 |
| 5,021,802 | 6/1991 | Allred | 346/1.1 |
| 5,124,718 | 6/1992 | Koike et al. | 346/1.1 |
| 5,151,128 | 9/1992 | Fukushima et al. | 106/20 R |
| 5,156,675 | 10/1992 | Breton et al. | 106/22 R |
| 5,174,815 | 12/1992 | Kondo et al. | 106/20 R |
| 5,238,783 | 8/1993 | Taniguchi et al. | 430/281 |
| 5,356,464 | 10/1994 | Hickman et al. | 106/20 |

FOREIGN PATENT DOCUMENTS

| | | |
|---|---|---|
| 0592774 | 4/1994 | European Pat. Off. . |
| 3240557 | 10/1991 | Japan . |

OTHER PUBLICATIONS

"Temperature–Independent Isoviscous Effect In Ternary Systems Of Water Tetronic 1307, And Herma", M. G. Fakes, A. R. Mlodozeniec, G. M. Zenter, Journal of Colloid and Interface Scoiences, vol. 138, No. 2, Sep. 1990, pp. 505–514.

*Primary Examiner*—Helene Klemanski
*Attorney, Agent, or Firm*—Ralph D'Alessandro

[57] ABSTRACT

An aqueous phase change ink contains a water dispersible sulphonated polyester gloss agent and a selected concentration of hyperthermogelling component that causes the ink to gel when its temperature is increased to its thermo-inversion point or when the concentration of the hyperthermogelling component is increased by evaporation, or substrate absorption, of water from the ink. The ink may be jetted directly onto a heated and/or absorptive substrate or jetted onto a cooler and/or hydrophobic surface before being transferred to the substrate. The thermo-inversion point is preferably about ambient temperature, and the preferred hyperthermogelling component is a nonionic surfactant, such as an ethylene oxide propylene oxide block copolymer surfactant.

36 Claims, 2 Drawing Sheets

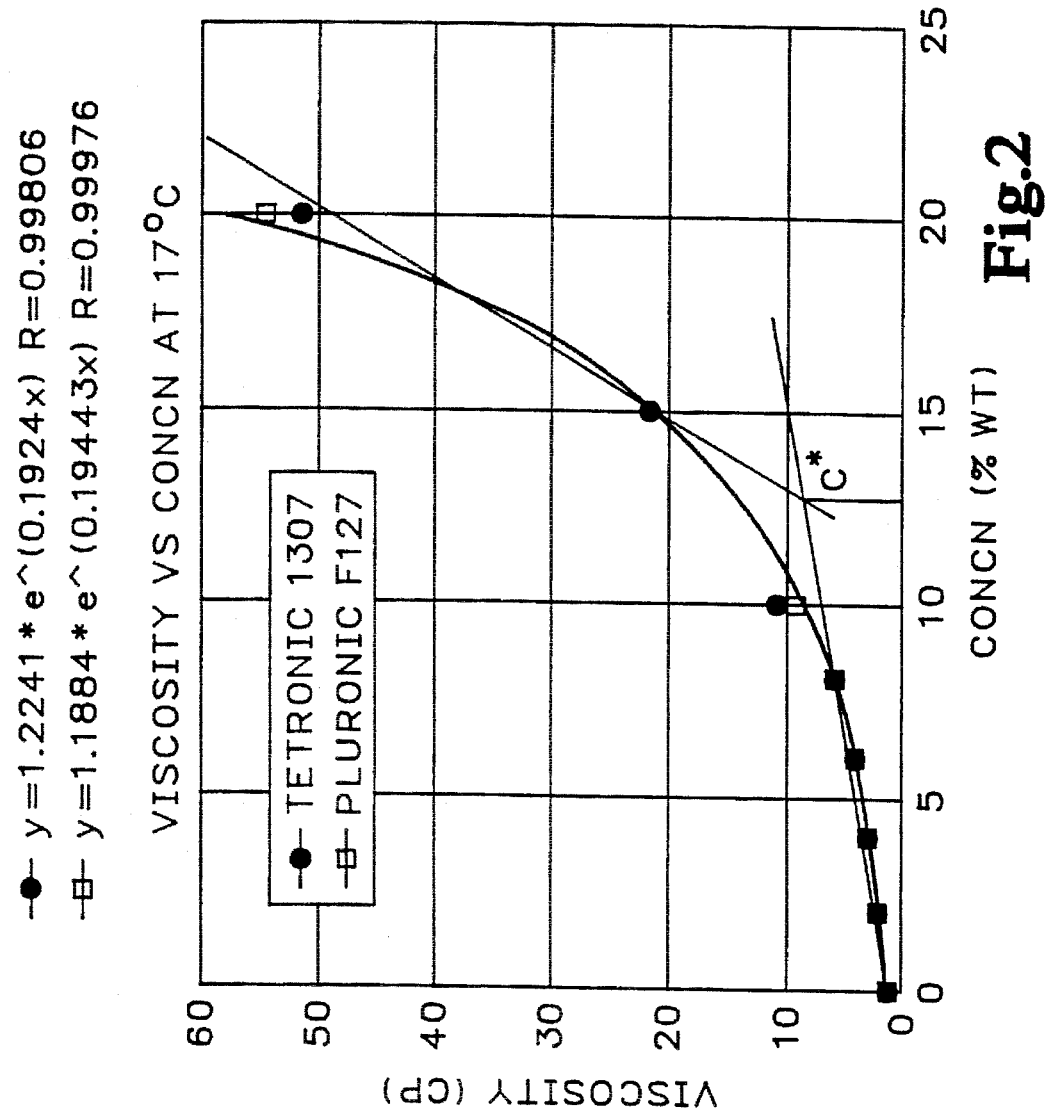

WATERFAST HIGH GLOSS HYPERTHERMOGELLING AQUEOUS PHASE CHANGE INK AND METHOD FOR USE

This application is a continuation-in-part of U.S. Ser. No. 08/239,105, filed May 6, 1994, now U.S. Pat. No. 5,462,591 issued Oct. 31, 1995 and assigned to the assignee of the present invention.

TECHNICAL FIELD

This invention relates to improved phase change inks and, in particular, to methods for printing such inks employing hyperthermogelling components that reduce feathering, provide waterfastness and a high gloss.

BACKGROUND OF THE INVENTION

In general, conventional phase change inks are in the solid phase at ambient temperature, but exist in the liquid phase at an elevated operating temperature of an ink jet printing device. At the jet operating temperature, droplets of liquid ink are ejected from the printing device and, when the ink droplets contact the surface of the printing medium, they quickly solidify to form a predetermined pattern of solidified ink dots.

More recently impulse inks or bubble jet inks have been disclosed in U.S. Pat. No. 5,021,802. These inks comprise an aqueous sol-gel medium and coloring agents. The inks are thermally reversible sol-gels and exhibit conventional phase change ink behavior such that they are gels (solids) at ambient temperatures and sols (liquids) at elevated temperatures between about 40°–100° C.

An inherent problem associated with aqueous inks employed in drop-on-demand color printers is "feathering" of ink drops after placement onto a substrate such as paper. Feathering is the undesirable nonuniform dispersal or wicking of ink drops along the paper fibers after the inks are placed on the print medium. Feathering may cause intercolor bleeding, poor resolution, and image degradation adversely affecting the print quality. Attempts to resolve this problem include the use of cosolvents to reduce drying time, the use of latex-based inks, the addition of zwitterionic surfactants, the use of pigmented inks, and the use of solid inks. Although solid inks tend not to feather when printed, their implementation significantly increases the cost and complexity of the equipment needed to print such inks.

Aqueous based inks however, suffer from several inherent deficiencies. One especially troublesome problem is the soaking of the ink into paper substrates. This results in poor holdout and ink drop definition, manifesting as "bloom" or "show through" on the back side of the paper. Additionally, the ink tends to run or smear when exposed to water. The lack of gloss in the ink, evident typically in a matte type of finish, also is seen as a deficiency in the use of aqueous inks where bright, glossy images are obtained only by use of specially coated papers. The waterfastness of the inks has been another persistent problem.

These problems are solved by the present invention wherein an aqueous ink utilizes a sulphonated polyester and its copolymers to obtain a high gloss, quick drying, waterfast, and excellent holdout ink.

SUMMARY OF THE INVENTION

It is an aspect of the present invention to reduce image degradation associated with the printing of aqueous inks and produce a high gloss, waterfast aqueous based ink.

It is another aspect of this invention to provide a means for reducing the cost and complexity of printer architecture associated with printing conventional phase change inks.

It is a feature of the present invention that the ink provides a waterfast, high gloss finish upon drying.

It is another feature of the present invention that the ink includes a sulphonated polyester and its copolymers as a gloss agent.

It is an additional feature of the present invention that the gloss agent acts as a binder, providing waterfastness to dyes that are not normally waterfast in an aqueous ink.

It is yet another feature of the present invention that the gloss agent remains in solution and does not precipitate out of the solution.

It is still another feature of the present invention that a humectant can be added to the formulation to permit reversible clearing of fouled ink jets to be achieved.

It is yet a further feature of the present invention that there is a rapid change in viscosity of the jetted ink on the surface of the printed substrate as water wicks away and gelling occurs so that the colorant remains on the surface of the substrate.

It is an advantage of the present invention that the ink is fast drying.

It is another advantage of the present invention that the ink formulation can use a dye or a pigment as the colorant and still be jettable, permanent, waterfast and possess high gloss.

It is a further advantage of the present invention that the ink formulation attains full color development because of the rapid viscosity change in the jetted ink.

It is still another advantage of the present invention that the ink formulation utilizes an inherently liquid polymeric colorant that does not "bloom" to the surface of the printed image or migrate and "show through" on the back side of the printed substrate.

It is yet a further advantage of the present invention that the ink formulation provides a waterfast, projectable image with bright colors for use on a transparency and the image does not block or offset.

It is still a further advantage of the present invention that the ink formulation is stable and the components remain in formulation and do not precipitate out, permitting significant acid base type chemistry.

It is an additional advantage of the present invention that the ink formulation employs a gloss agent that is a water dispersible polymer that is pH independent and does not suffer from the usual base neutralization disadvantages of conventional acrylic systems where drift in viscosity with pH change and irreversible precipitation may occur because of water evaporation.

The present invention employs aqueous phase change inks containing water soluble compounds that exhibit thermo-inversion properties, by which is meant compounds whose water solubility decreases as the solution temperature increases. When ink solutions of these selected compounds are heated to their thermo-inversion points, they exhibit hyperthermogelling properties where these selected compounds undergo a phase transition to form discrete, stable gels. In the present invention this occurs in ink dot gels.

At low concentrations, aqueous solutions of these hyperthermogelling compounds exhibit moderate viscosities. However, at a critical concentration of a particular hyperthermogelling compound, a small increase in the concentration of the compound or the temperature of the solution causes a rapid increase in viscosity, ultimately leading to complete gelling of the solution. These effects of temperature and concentration are exploited to make novel ambient phase change inks that gel instantly on contact with a relatively heated or absorptive substrate. Hyperthermogelling compounds include, but are not limited to, homopolymers, copolymers, nonpolymeric surfactants, and their derivatives. Compounds exhibiting this hyperthermogelling TETRONIC® 1307 surfactant. For example, TETRONIC® 1307 surfactant, having a molecular weight of 17,000, gels at about 30° C. at its critical concentration (about 13% by weight). "Aqueous phase change ink compositions having a coloring agent and a hyperthermogelling component can have the hyperthermogelling component have a concentration of between about 0.05% by weight to about its critical concentration."

TETRONIC® 1307 surfactant is a polyoxamine, having an alkyldiamine center (ethylene diamine, where w=2), a hydrophobic core of y propylene oxide units, and hydrophilic ends of x ethylene oxide units, as shown below:

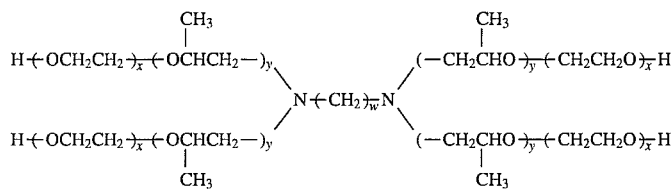

phenomenon at or above ambient temperature are preferred. An ink composition of such a compound can be jetted at ambient temperature and gels instantly on an unheated substrate to produce unfeathered ink dots.

These and other aspects, features and advantages are obtained in a waterfast, high gloss aqueous ink suitable for jetting in an ink jet printer by use of a pH independent, water dispersible polymer additive as a gloss agent in the ink formulation.

BRIEF DESCRIPTION OF THE DRAWINGS

These aspects, features and advantages of the present invention will become apparent upon consideration of the following detailed description of preferred embodiments of the invention, especially when taken in conjunction with the accompanying drawings wherein:

FIG. 2 is a graphical representation of the viscosity as a function of concentration of two hyperthermogelling components that are block copolymers of ethylene oxide and propylene oxide.

DETAILED DESCRIPTION OF PREFERRED EMBODIMENTS

Figure 1:
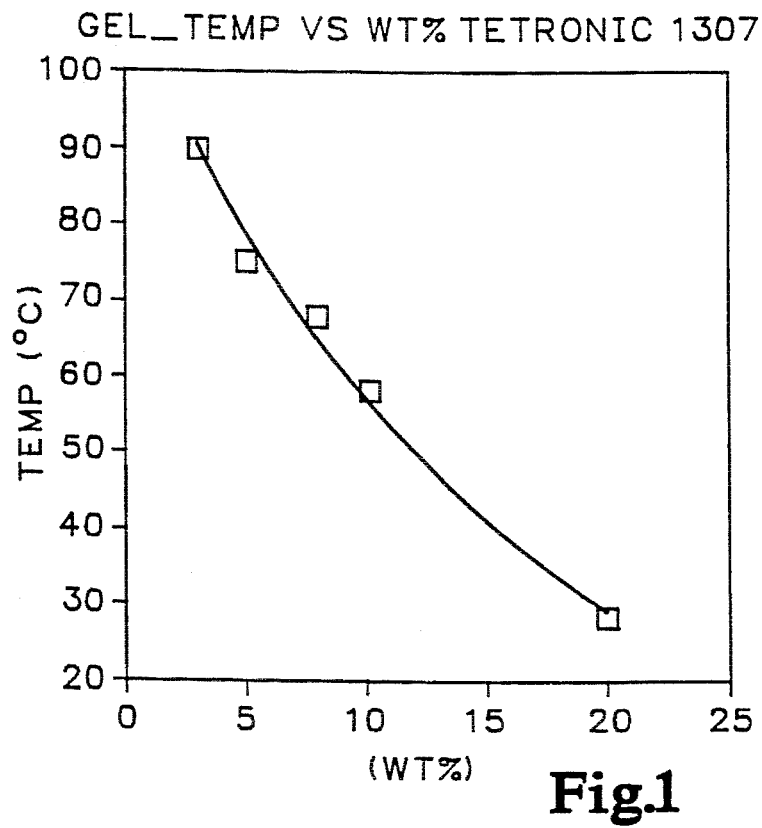
FIG. 1 is a graphical representation of the gelation temperature as a function of concentration of a preferred hyperthermogelling component.

A hyperthermogelling aqueous phase change ink of the present invention includes a nonionic surfactant. Nonionic surfactants, such as TETRONIC® 1307, exhibit good thermo-inversion gelling properties. FIG. 1 shows a graphical representation of the gelation temperature, i.e. the thermo-inversion point, of various concentrations of TETRONIC® 1307 is an ethylene oxide propylene oxide block 30 copolymer surfactant available commercially from BASF Corporation of Parsippany, N.J. In the present invention the hydrophobic moiety, when the solution is heated, clusters together to form a skeletal network of a continuous matrix swollen in a liquid phase, water. The hydrophilic moiety interacts with water through hydrogen bonding to form a gel. Block copolymer gels are hypothesized to be formed by hydrogen bonding in aqueous systems through the ether oxygen atoms with water protons.

A preferred embodiment of the hyperthermogelling aqueous phase change ink includes a gloss agent that is a water soluble or water dispersible polyester or homopolymer or copolymer that provides a high gloss. The polyester is preferably a sulphonated polyester, such as any of the sulpho-polyesters made by a polycondensation reaction of selected dicarboxylic acids (A's) and glycols (G's) to produce the linear structure shown below and sold under the tradename "Eastek®" polymers 1100, 1200 1300 and 2100 by Eastman Chemical Company of Kingsport, Tenn. The polyester can be made water dispersible by carboxylated, hydroxylated or prosphonated groups replacing the sulphonated groups, or used in combination with those sulphonated groups. Copolymers of the polyester can make the polyester water soluble by using hydrophilic groups. Hydroxylated polyesters can also be cross-linked with various functional resins, including but not limited to melamine derived materials or phenolic based resins, to produce solvent resistant ink useful in industrial marking applications. The sulphonated polyester is represented by the following:

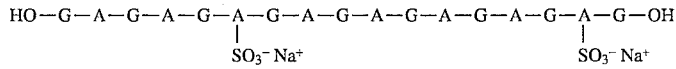

The polyester additive that serves as the gloss agent is pH independent and does not suffer from the base neutralization disadvantages of conventional acrylic systems. The preferred sulphonated polyesters are compatible in ambient ink formulations with either polymeric or conventional acid dyes. It is possible to use low levels of cationic polymers in an aqueous ink jet ink so that the polymeric dye is ionically coupled to the polymer by ionic bonds.

The gloss agent imparts the gloss feature to aqueous inks which do not normally possess glossiness, but rather usually display only a matte finish. The gloss agent also acts as a binder to provide waterfastness to dyes that do not normally exhibit this characteristic in water based inks. The pH independence of the ink formulation using the instant gloss agent overcomes the deficiency of traditional acrylic based systems which are susceptible to irreversible precipitation and viscosity drift as the pH varies because of evaporation of the fugitive salt. Precipitation and viscosity changes in the ink formulation are avoided utilizing the gloss agent of the instant invention.

Dispersions using three different Eastek® polymers were used in three samples to determine the dilutability of the sulphonated polyesters in ink based resins. The dispersions were diluted to about 1%, about 5%, and about 10% by weight and the viscosity was measured in centipoise (cPs) for each sample with a Brookfield viscometer with the results shown below:

TABLE I

| Sample | SOLN PERCENT % BY WEIGHT | DILUTABILITY | | | |
| --- | --- | --- | --- | --- | --- |
| | | EASTEK® 1100 (cPs) | EASTEK® 1200 (cPs) | EASTEK® 1300 (cPs) | EASTEK® 2100 (cPs) |
| 1 | 1.000 | 1.190 | 1.240 | 1.260 | 1.220 |
| 2 | 5.000 | 1.630 | 1.590 | 1.490 | 1.400 |
| 3 | 10.000 | 2.380 | 2.320 | 1.920 | 1.660 |

The dispersions were mixed for about thirty minutes at room temperature with a magnetic stirring bar. These dispersions have good stability with no signs of settling out occurring.

The ink formulation utilizing the gloss agent additive attains full color development in an ink jet printer because of the rapid change in viscosity of the jetted ink on the surface of the printed substrate as water wicks away and gelling occurs so that the colorant remains on the surface of the substrate. This results in bright, glossy images on plain paper without the need for specially coated papers normally required to achieve this level of color brightness. The formulation may be used for printing equally well on various substrates including plain paper, glossy paper, copier paper or transparencies.

The viscosity and surface tension of aqueous solutions of the aforementioned TETRONIC® 1307 surfactant used in the ink formulations at different concentrations are shown in Table II and are graphically represented in FIG. 2.

TABLE II

Viscosity and Surface Tension
Tetronic 1307/$H_2O$ Solutions at 15–16° C.

| Solution | Con. of T-1307 (% W/W) | $\mu$ (cPs) | $\gamma$ (dynes/cm) |
| --- | --- | --- | --- |
| A | 2 | 1.90 | 41.27 |
| B | 4 | 2.76 | 38.20 |
| C | 6 | 3.98 | 38.13 |
| D | 8 | 5.62 | 37.84 |
| E | 10 | 10.60 | 38.25 |
| F | 15 | 21.30 | 38.87 |
| G | 20 | 51.40 | 39.99 |
| $H_2O$ | 0 | 1.0 | 71.86 |

The solutions A–G were prepared with weighed amounts of distilled water and TETRONIC® 1307 surfactant and were stirred overnight at 15°–16° C. to obtain clear solutions. The surface tension measurements were made on a Cahn dynamic contact angle instrument. The viscosity (centipoise (cPs)) measurements were obtained with a Brookfield Thermosel viscometer at a spindle speed of about 60 rpm.

With reference to the previously depicted TETRONIC® surfactant structural formula, skilled persons will appreciate that numerous homologs of the surfactant may be employed. Preferred homologs contain about 10% to about 80% poly(oxyethylene) and about 20% to about 60% poly(oxypropylene) where w is an integer from 2 to 6 and x and y are any integers that satisfy the weight percent and molecular weight ranges and have a molecular weight of about 1,000 to about 50,000. Skilled persons will appreciate that homologs of the following structural formula are also preferred subject to the same weight percent and molecular weight ranges:

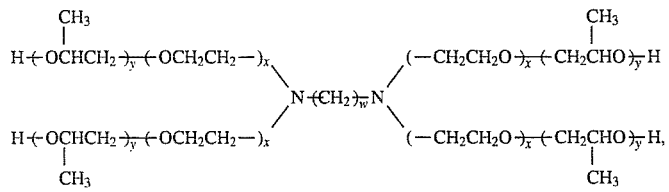

A preparation of a hyperthermogelling aqueous phase change ink made with TETRONIC® 1307 surfactant, having a molecular weight of about 17,000, is described below in Example I.

EXAMPLE I

A test ink solution was prepared by the following procedure. About a 9% by weight solution of TETRONIC® 1307 surfactant in distilled water was prepared at about 15°–16°

C., mixed for about 12 hours to achieve complete dissolution, and filtered through a 0.2 micron filter. Two humectants, PEG 200, polyethylene glycol of molecular weight 200, at about 3% by weight and monoethanol acetamide commercially available from Croda Inc. of New York, N.Y., at about 5% by weight were added to the solution. An Acid Blue 9 (a common dye) solution of about 100 mg to about 1 ml was added to the surfactant solution and uniformly mixed to yield a cyan ink composition of about 9% weight by volume of TETRONIC® 1307 surfactant.

The cyan ink was jetted from a PZT driven single jet at about 20° C. The jet printed several dotted lines on a plain paper.

Dot patterns from the experimental ink composition and the dot patterns from a Hewlett Packard (HP) 1200C ink jet printer for cyan and black inks were compared. The cyan ink was made using a dye, while the black ink was made using a black pigment which has a higher solids content and therefore has sharper defined dot edges. The ink dots all had about 90 nanograms drop mass and a velocity upon ejection of between about 3–4 meters per second. However, the black pigment is more difficult to use in ink jet applications because of dispersal problems in aqueous solution and nozzle clogging. The discreteness of dots of the experimental ink was better than that of the HP1200C cyan or black ink dots. The dot edges of the test or experimental ink composition were sharper than the HP cyan dye, and leathering was significantly less than both the HP cyan and black inks.

EXAMPLE II

With reference to Table III, test ink solutions A–F of methylcellulose, another hyperthermogelling agent available commercially from The Dow Chemical Company under the trademark METHOCEL cellulose ether (MEC A-15), were prepared in a manner similar to that described for Example I. The structural formula for methylcellulose is shown below:

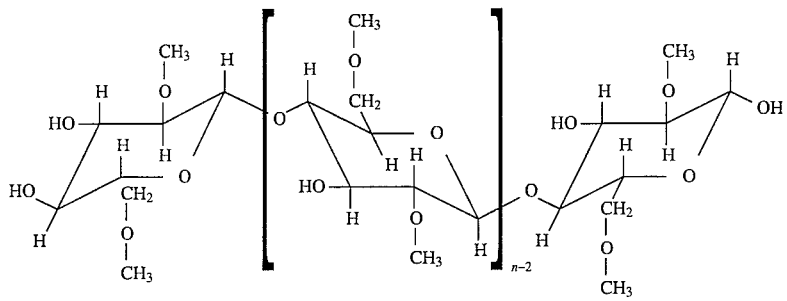

Preferred MEC homologs have a molecular weight of about 2,000 to about 100,000 where n represents the total number of rings and is any integer that satisfies the molecular weight range.

Figure 3:
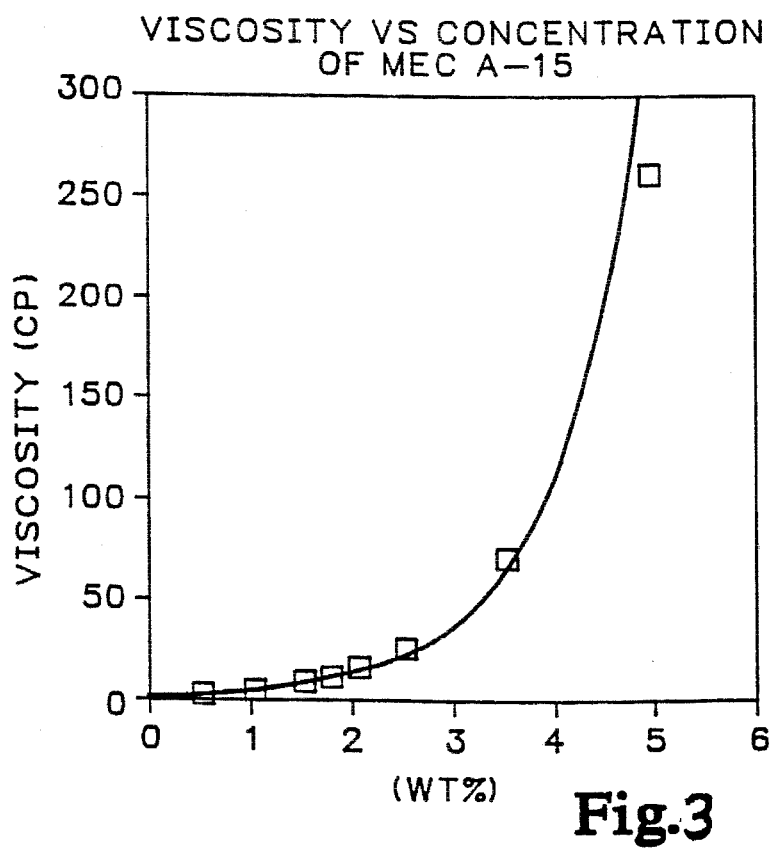
FIG. 3 is a graphical representation of viscosity as a function of concentration of methylcellulose, another hyperthermogelling component.

Acid Blue 9 and Acid Red 52 in Table II represent common dyes and PEG-200 represents polyethylene glycol of molecular weight 200 which acts as a humectant and viscosity modifier. The viscosities of these aqueous solutions are shown in Table III and graphically represented in FIG. 3. Exact surface tension measurements were not conducted for each of the solutions. The surface tension for each was estimated to be between about 48 and about 55 dynes/cm based on the analysis of a base solution without the addition of coloring agents, The ink solutions were jetted from a 64 nozzle print head at about 4 kHz of a Tektronix ColorQuick™ aqueous ink jet printer at ambient temperature and generally produced discrete ink dots.

TABLE III

| | Concentration of Components (Wt %) | | | | | |
| | Solution | | | | | |
| Components | A | B | C | D | E | F |
|---|---|---|---|---|---|---|
| MEC A-15 | 0.50 | 0.75 | 0.75 | 1.0 | 1.25 | 1.875 |
| PEG-200 | — | — | — | — | — | 5 |
| Acid Blue 9 | 1.5 | 3.0 | — | 1.5 | 1.5 | 1.5 |
| Acid Red 52 | — | — | 2.5 | — | — | — |
| Viscosity μ (c) | 2.2 | 3.5 | 3.5 | 4.6 | 6.0 | 12 |

EXAMPLE III

With reference to Table IV, test ink solutions A–E of TETRONIC® 1307 surfactant, PEG-200, and Acid Blue 9 were prepared and jetted as described above. Exact surface tension measurements were not conducted for each of the solutions. The surface tension for each was estimated to be between about 38 and about 39 dynes/cm based on the analysis of a base solution without the addition of coloring agents.

The ink solutions formed discrete ink dots.

TABLE IV

| | Concentration of Components (Wt %) | | | | |
| | Solution | | | | |
| Components | A | B | C | D | E |
|---|---|---|---|---|---|
| Tetronic 1307 | 6 | 7 | 8 | 10 | 10 |
| PEG-200 | 5 | 5 | 5 | 5 | 10 |
| Acid Blue 9 | 1.5 | 1.5 | 1.5 | 1.5 | 1.5 |
| Viscosity μ (c) | 5.0 | 6.2 | 8.0 | 12.1 | 15.0 |

EXAMPLE IV

With reference to Table V, test ink solutions A–C utilizing PLURONIC® F 127 surfactant, PEG-200, and Acid Blue 9 were prepared and jetted as described above. PLURONIC®F surfactant is an ethylene oxide propylene oxide block copolymer available commercially from BASF Corporation of Parsippany, N.J. that has hyperthermogelling properties similar to those of TETRONIC® surfactant. The poly(ethylene oxide-co-propylene oxide) and poly(propylene oxide-co-ethylene oxide) structural formulas for PLURONIC® surfactant respectively are shown below:

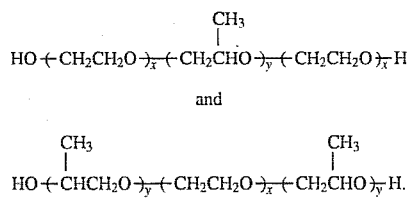

Preferred PLURONIC® surfactant homologs have a molecular weight of about 1,000 to about 50,000 and contain about 10% to about 80% poly(oxyethylene) and about 20% to about 60% poly(oxypropylene) where and x and y are integers that satisfy the above weight percent and molecular weight ranges. Exact surface tension measurements were not conducted for each of the solutions. The surface tension for each was estimated to be between about 38 and about 39 dynes/cm based on the analysis of a base solution without the addition of coloring agents. The ink solutions formed discrete dots.

TABLE V

| | Concentration of Components (Wt %) | | |
|---|---|---|---|
| | Solution | | |
| Components | A | B | C |
| Pluronic F127 | 6 | 7 | 8 |
| PEG-200 | 5 | 5 | 5 |
| Acid Blue 9 | 1.5 | 1.5 | 1.5 |
| Viscosity μ (c) | 5.0 | 6.2 | 8.0 |

EXAMPLE V

With reference to Table VI, test ink solutions A–G of TETRONIC® 1307 surfactant, PEG-200, SAG-47, and different coloring agents were prepared in a manner similar to that described above. SAG-47 is a defoaming agent available from OSI Specialties, Inc., and Acid Yellow 23 is a common coloring agent. Food Black 2 is a common coloring agent for black inks. The ink solutions were jetted on a full array prototype print head having 352 nozzles at 11 kHz. The solutions formed discrete ink dots.

TABLE VI

| | Concentration of Components (Wt %) | | | | | | |
|---|---|---|---|---|---|---|---|
| | Solution | | | | | | |
| Components | A | B | C | D | E | F | G |
| Tetronic 1307 | 10 | 10 | 10 | 10 | 10 | 10 | 10 |
| PEG-200 | 10 | 10 | 10 | 10 | 10 | 10 | 10 |
| SAG-47 (ppm) | — | 500 | 250 | 500 | 250 | 20 | 500 |
| Acid Blue 9 | 1.5 | 0.875 | | | | 1.0 | 0.875 |
| Acid Red 52 | | | 1.5 | | | | |
| Acid Yellow 23 | | | | 1.0 | | | |
| Food Black 2 | | | | | 2.0 | | |
| Viscosity μ (cPs) | 13 | 11.5 | 12 | 12 | 12 | 11.5 | 11.5 |
| Surface Tension γ (dyne/cm) | 38 | 34 | 38 | 38 | 38 | 34 | 34 |

Some additional compounds that exhibit thermo-inversion behavior similar to TETRONIC® 1307 surfactant are listed in Table VII.

TABLE VII

| Polymers | Thermo-inversion point (Tp+) |
|---|---|
| poly(ethylene oxide) PEO | 95° C. |
| poly(ethylene oxide-co-propylene oxide) PEO-PO (66%) | 50 |
| poly(vinyl Methyl ether) PVME | 30 |
| poly(N-isopropylacrylamide) PIPAAm | 30 |
| poly(methacrylic acid) PMAA | 55 |
| poly(vinyl pyrrolidone) PVP | 140 |
| poly(vinyl alcohol) PVAL | 120 |
| poly(vinyl acetate-co-vinyl alcohol) | |
| PVAC-co-VAL (10%) | 85 |
| PVAC-co-VAL (20%) | 50 |
| PVAC-co-VAL (30%) | 15 |
| PVAC-co-VAL (50%) | 20 |
| PVAC-co-VAL (70%) | −20 |
| poly(vinyl methyl oxazolidone) PVMO | 38 |
| poly(vinyl acetate-co-vinyl pyrollidone) | 0 |

EXAMPLE VI

An ink formulation was mixed consisting of about 25.32 grams of about a 20% TETRONIC® 1307 surfactant equivalent to about 5% by weight of the total formulation, about 3.08 grams of the humectant acetamide monoethanolamine available commercially from Croda Inc., of New York, N.Y. as AMEA-100 and comprising about 3% by weight of the total formulation, about 2.06 grams of the humectant polyethylene glycol available as PEG-200 available commercially from Aldrich Chemical of Milwaukee, Wis. and comprising about 2% by weight of the total formulation, about 3.03 grams of methyl diethanol amine also available commercially from Aldrich Chemical and comprising about 5% by weight of the total formulation, about 1 drop of Proxel GXL which is an industrial microbiostat available commercially from ICI Biocides of Wilmington, Del., about 10.62 grams of about 30% Eastek polymer 1300 gloss agent available commercially from Eastman Chemical Company of Kingsport, Tenn. comprising about 3% by weight of the total formulation, about 5.07 grams of a polymeric yellow dye available commercially from Milliken and Company of Spartanburg, S.C. as MY-1869 and comprising about 5% by weight of the total formulation, and about 52.27 grams of deionized water content in the formulation of about 79% by weight. The mixture was stirred for about 30 minutes at room temperature with a magnetic stirrer. The viscosity of the dispersion was measured on a Brookfield viscometer to be about 9.24 centipoise (cPs). The surface tension was about 38.27 dynes per centimeter measured on a dynamic contact angle analyzer available commercially from Cahn Instruments, Inc. of Cerritos, Calif. as model DCA-312. The pH of the formulation was about 10.12.

The ink formulation was jetted by an Epson Stylus color printer to generate a solid fill image. The printed solid fill image possessed a high degree of optical density and was subjected to several waterfastness tests. In one test the sample was rubbed with wet fingers without any noticeable smearing of the solid fill image. In a second test the sample was placed under the running water of a faucet without any noticeable loss in color and an apparent 100% waterfastness. In a third test the sample with the solid fill image was taped onto a rotatable wheel and the wheel was rotated to pass the sample through a trough of water at a speed of about 1 revolution every 10 seconds. The ΔE, representing the color deviation of the original solid fill image comparing the color before and after the testing, was measured after 1 and 10 revolutions. The ΔE test results of the yellow ink are as shown in the Table VIII below, wherein the color deviation ΔE was measured with an ACS Spectrophotometer, reflecting the change in lightness, darkness and shade of the color.

Comparative results were also obtained with a commercially available Hewlett Packard (HP) yellow ink jetted from an HP 1200C color printer. As reflected by the values in Table VIII below, the color deviation for the ink formulation in Example VI is markedly better than for the commercially available HP yellow ink, indicating far less 35 color change following exposure to water on the water wheel after both 1 and 10 revolutions than the HP yellow ink. The Example VI ink formulation displayed substantially improved color on plain paper as far as brightness and color fastness.

TABLE VIII

| | ΔE (Color Deviation) | |
| --- | --- | --- |
| | Example 6 Yellow | HP Yellow |
| 1-revolution | 1.29 | 12.33 |
| 10-revolutions | 1.70 | 37.13 |

Comparative Example 1

An ink consisting of about 250.6 grams of TETRONIC® 1307 surfactant equivalent to about 5 % by weight of the total formulation, about 3.02 grams of the humectant acetamide monoetharkolamine available commercially from Croda Inc., of New York, N.Y. as AMEA-100 and comprising about 3 % by weight of the total formulation, about 2.06 grams of the humectant polyethylene glycol available as PEG-200 available commercially from Aldrich Chemical of Milwaukee, Wis. and comprising about 2% by weight of the total formulation, about 5.01 grams of methyl diethanol amine also available commercially from Aldrich Chemical and comprising about 5 % by weight of the total formulation, about 1 drop of Proxel GXL which is an industrial microbiostat available commercially from ICI Biocides of Wilmington, Del., about 5.06 grams of a polymeric yellow dye available commercially from Milliken and Company of Spartanburg, S.C. as MY-1869 and comprising about 5 % by weight of the total formulation, and about 62.17 grams of deionized water resulting in a total water content in the formulation of about 80% by weight. The mixture was stirred for about 30 minutes at room temperature with a magnetic stirrer. The viscosity of the dispersion was then measured on a Brookfield viscometer to be about 7.72 centipoise (cPs). The surface tension was measured to be about 38.29 dynes per centimeter measured on a dynamic contact angle analyzer available commercially from Cahn Instruments, Inc. of Cerritos, Calif. as model DCA-312. The pH of the formulation was about 9.3. The ink formulation was jetted from an Epson Stylus color printer to generate a solid fill image. The solid fill image possessed a lower optical density than the solid fill image of Example VI. The printed solid fill image was subjected to several waterfastness tests. In one test the sample was rubbed with wet fingers without any noticeable smearing. In a second test the sample was placed under the running water of a faucet with some slight loss in color and an excellent waterfastness. In a third test the sample was taped onto a wheel and the wheel was rotated to pass the sample through a trough of water at a speed of about 1 revolution every 10 seconds, and the ΔE color deviation was measured after 1 and 10 revolutions. The test results of the yellow ink are as shown below, wherein the ΔE is the color deviation measured by an ACS Spectrophotometer which measures change in color of lightness, darkness and shade:

1-revolution: 3.26

10-revolutions: 26.60

It is to be noted that numerous concentrations and combinations of these hyperthermogelling components and gloss agents may be employed. Skilled persons in the art will appreciate that a variety of other components that exhibit hyperthermogelling properties may be employed in ink compositions of the present invention. Such components may include, but are not limited to, homopolymers, copolymers, nonpolymeric or nonionic surfactants, naturally occurring polymers and their derivatives.

For example, cellulose derivatives such as hydroxypropyl methyl ether cellulose (HPMEC), shown below, can also be employed:

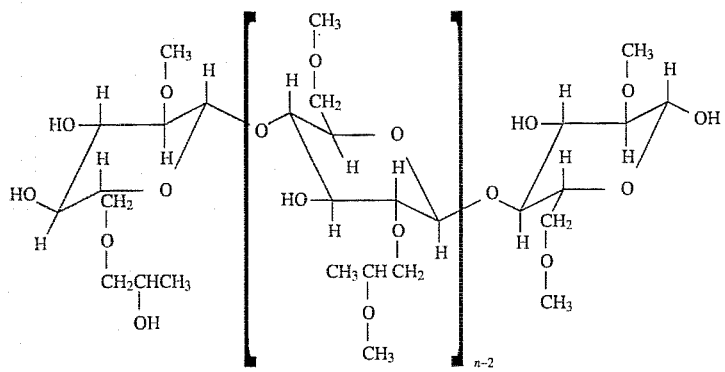

Preferred HPMEC homologs have a molecular weight of about 1,000 to 100,000 where n represents the total number of rings and is any integer that satisfies the molecular weight range.

Persons skilled in the art will also appreciate that hyperthermogelling components with the gloss agent are compatible with a variety of coloring agents and ink additives including suitable dyes and biocides that can be added to the formulations. Skilled persons will also appreciate that hyperthermogelling ink compositions are compatible with variety of drop-on-demand ink jet printing techniques and existing equipment.

For example, a drop of an ink composition containing a hyperthermogelling component with the gloss agent may be jetted from a conventional drop-on-demand ink jet printer onto an absorptive substrate such as paper to exploit the concentration-related gelling properties of the hyperthermogelling component. The ink drop will lose water by penetration into paper and by evaporation. This small loss of water will increase the concentration of the gelling compound to result in a rapid increase in viscosity. This viscosity increase will reduce the spreading of the ink dot and make difficult the unwanted excessive penetration of the substrate. The instant viscosity increase will lead to less feathering, sharp dots, and hence, improved print quality. Alternatively, the ink drop may be jetted onto a slightly hydrophobic surface and then transferred to an absorptive substrate.

In an alternative embodiment, the ink drop with the gloss agent may be jetted onto a substrate that is warmer than the thermo-inversion point of the ink composition. Contact with the warm substrate will instantly gel the ink drop. Alternatively, the ink drop may be jetted onto a surface having a temperature below the thermo-inversion point of the ink composition and then transferred to a warmer substrate.

Similarly, a hyperthermogelling ink composition may be formulated to have a thermo-inversion point at ambient temperature, e.g. 25° C. Such an ink composition could be jetted as a liquid below ambient temperature and would gel instantly after contacting the substrate.

It should be noted that the gel ink formulations with the gloss agent of the present invention are porous solids that involve a continuous matrix as their "solid" element. This continuous matrix or skeletal network provides the gel system with the required mechanical stability and coherence. between clusters of hydrophobic groups, such as propylene oxide. The clusters can be a copolymer, such as ethylene oxide propylene oxide copolymer, or may be simply a homopolymer, such as methylether cellulose.

It will be apparent to skilled persons that many changes may be made to the details of the specific embodiments of the invention described herein without departing from the underlying principles thereof. For example, the ink formulation of the present invention can be employed in piezo driven printer, as well as a bubble jet or continuous ink jet printer. The overall ink properties and characteristics are not limited to the type of dispensing device, but are such that they will work in a variety of applications including flexographic ink formulations and in intaglio printing presses. The ink formulation is also suitable for use in an offset printing architecture where the image is first printed on an intermediate transfer surface and is then transferred to a final receiving surface. The scope of the present invention should accordingly be determined only by the following claims.

What is claimed is:

1. An aqueous phase change ink composition, comprising:

a coloring agent;

a water dispersible polyester gloss agent; and an amount of hyperthermogelling component in a concentration such that the ink composition is in a liquid state at a first temperature and is in a solid state at a second temperature where the second temperature is greater than the first temperature.

2. The ink composition of claim 1 in which the water dispersible polyester gloss agent is selected one from the group consisting of a carboxylated polyester, a hydroxylated polyester, a phosphonated polyester, a sulphonated polyester, homopolymers or copolymers thereof, or combinations thereof.

3. The ink composition of claim 1 in which the water dispersible polyester gloss agent is a sulphonated polyester or copolymer of a sulphonated polyester.

4. The ink composition of claim 1 in which the hyperthermogelling component has a thermo-inversion point between about −20° C. to about 140° C.

5. The ink composition of claim 1 in which the hyperthermogelling component forms a stable gel at the second temperature.

6. The ink composition of claim 1 in which the hyperthermogelling component comprises a nonionic polymer.

7. The ink composition of claim 1 in which the hyperthermogelling component comprises the formula:

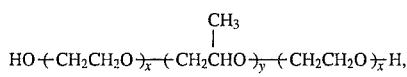

that contains about 10% to about 80% poly(oxyethylene) and about 20% to about 60% poly(oxypropylene) where x and y are any integers that satisfy the weight percent and molecular weight ranges and the hyperthermogelling component has a molecular weight range of about 1,000 to about 50,000.

8. The ink composition of claim 1 in which the hyperthermogelling component comprises the formula:

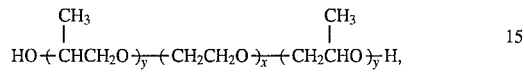

and contains about 10% to about 80% poly(oxyethylene) and about 20% to about 60% poly(oxypropylene) where x and y are any integers that satisfy the weight percent and molecular weight ranges and the hyperthermogelling component has a molecular weight range of about 1,000 to about 50,000.

9. The ink composition of claim 1 in which the hyperthermogelling component comprises the formula:

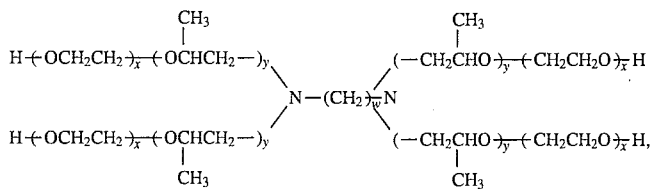

and contains about 10% to about 80% poly(oxyethylene) and about 20% to about 60% poly(oxypropylene) where w is an integer from 2 to 6 and x and y are any integers that satisfy the weight percent and molecular weight ranges and the hyperthermogelling component has a molecular weight range of about 1,000 to about 50,000.

10. The ink composition of claim 1 in which the hyperthermogelling component comprises the formula:

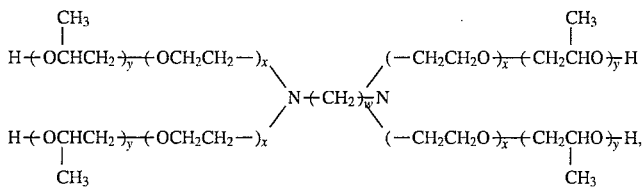

and contains about 10% to about 80% poly(oxyethylene) and about 20% to about 60% poly(oxypropylene) where w is an integer from 2 to 6 and x and y are any integers that satisfy the weight percent and molecular weight ranges and the hyperthermogelling component has a molecular weight range of about 1,000 to about 50,000.

11. The ink composition of claim 1 in which the hyperthermogelling component comprises the formula:

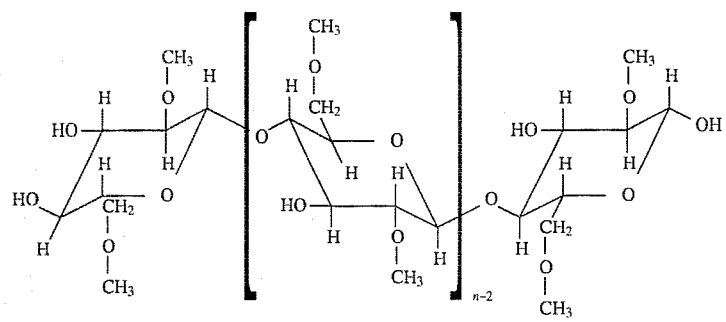

where n represents the total number of rings and is any integer that satisfies the molecular weight range and the hyperthermogelling component has a molecular weight range of about 1,000 to about 100,000.

12. The ink composition of claim 1 in which the hyperthermogelling component comprises the formula:

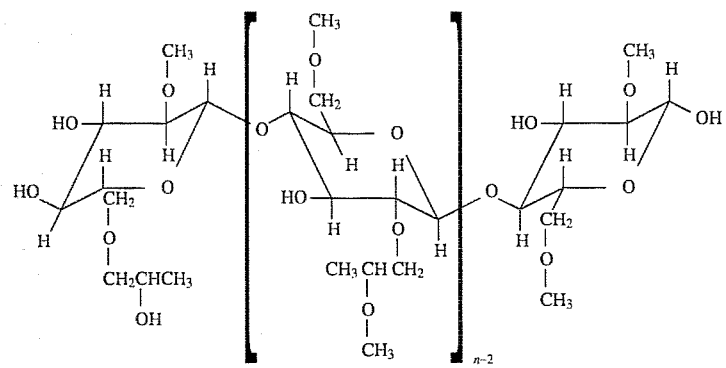

where n represents the total number of rings and is any integer that satisfies the molecular weight range and the hyperthermogelling component has a molecular weight range of about 1,000 to about 100,000.

13. The ink composition of claim 1 having concentration of the hyperthermogelling component between about 0.05 % by weight and to about its critical concentration.

14. A method of printing a hyperthermogelling aqueous phase change ink composition with a high gloss on a printing surface, comprising:

employing a water dispersible polyester as a gloss agent in the hyperthermogelling aqueous phase change ink composition;

jetting the hyperthermogelling aqueous phase change ink composition from a drop-on-demand ink jet printer onto the printing surface, the ink composition having an amount of a hyperthermogelling component in a first concentration such that the ink composition is in a liquid state; and increasing the concentration of the hyperthermogelling component in the ink composition by having water in the ink composition penetrate the printing surface or being evaporated so that the ink composition forms a stable gel.

15. The method of claim 14 in which the water dispersible polyester is selected one from the group consisting of a carboxylated polyester, a hydroxylated polyester, a phosphonated polyester, a sulphonated polyester, homopolymers or copolymers thereof, or combinations thereof.

16. The ink composition of claim 14 in which the water dispersible polyester gloss agent is a sulphonated polyester or a copolymer of a sulphonated polyester.

17. The method of claim 14 in which the printing surface comprises an absorptive substrate and in which water from the ink composition penetrates the absorptive substrate to increase the concentration of the hyperthermogelling component.

18. The method of claim 14 in which the surface comprises a hydrophobic substrate and the ink composition is transferred to an absorptive substrate so that water from the ink composition penetrates the absorptive substrate to increase the concentration of the hyperthermogelling component.

19. The method of claim 14 in which the ink composition has a thermo-inversion point and is heated to the thermo-inversion point to form a stable gel.

20. The method of claim 19 in which the printing surface has a temperature that is greater than or equal to the thermo-inversion point.

21. The method of claim 19 in which the printing surface has a lower temperature than the thermo-inversion point and in which the ink composition is transferred from the printing surface to a substrate having a temperature that is greater than or equal to the thermo-inversion point.

22. The method of claim 14 in which the ink composition has a thermo-inversion point at ambient temperature and in which the ink composition is cooled to facilitate jetting.

23. The method of claim 14 in which the hyperthermogelling component has a thermo-inversion point between about 20° C. to about 140° C.

24. The method of claim 14 in which the hyperthermogelling component forms a stable gel at the thermo-inversion point.

25. The method of claim 14 in which the hyperthermogelling component comprises a nonionic polymer.

26. The method of claim 14 in which the hyperthermogelling component comprises the formula:

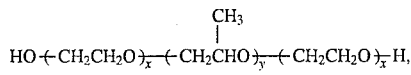

and contains about 10% to about 80% poly(oxyethylene) and about 20% to about 60% poly(oxypropylene) where x and y are any integers that satisfy the weight percent and molecular weight ranges and the hyperthermogelling component has a molecular weight range of about 1,000 to about 50,000.

27. The method of claim 14 in which the hyperthermogelling component comprises the formula:

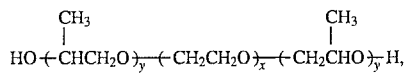

and contains about 10% to about 80% poly(oxyethylene) and about 20% to about 60% poly(oxypropylene) where x and y are any integers that satisfy the weight percent and molecular weight ranges and the hyperthermogelling component has a molecular weight range of about 1,000 to about 50,000.

28. The method of claim 14 in which the hyperthermogelling component comprises the formula:

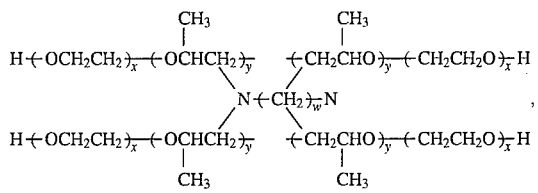

and contains about 10% to about 80% poly(oxyethylene) and about 20% to about 60% poly(oxypropylene) where w is an integer from 2 to 6 and x and y are any integers that satisfy the weight percent and molecular weight ranges and the hyperthermogelling component has a molecular weight range of about 1,000 to about 50,000.

29. The method of claim 14 in which the hyperthermogelling component comprises the formula:

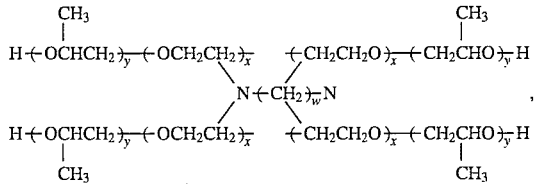

and contains about 10% to about 80% poly(oxyethylene) and about 20% to about 60% poly(oxypropylene) where w is an integer from 2 to 6 and x and y are any integers that satisfy the weight percent and molecular weight ranges and the hyperthermogelling component has a molecular weight range of about 1,000 to about 50,000.

30. The method of claim 14 in which the hyperthermogelling component comprises the formula:

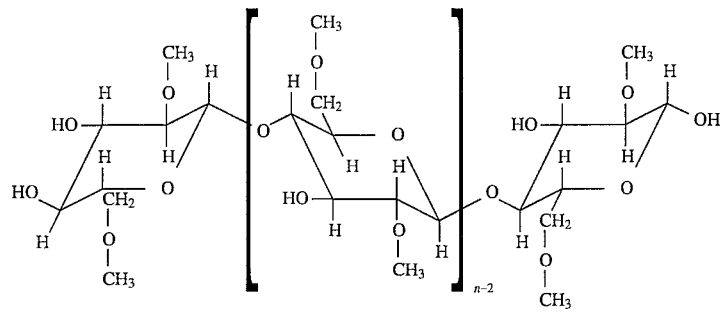

and the hyperthermogelling component has a molecular weight range of about 1,000 to about 100,000.

31. The method of claim 14 in which the hyperthermogelling component comprises the formula:

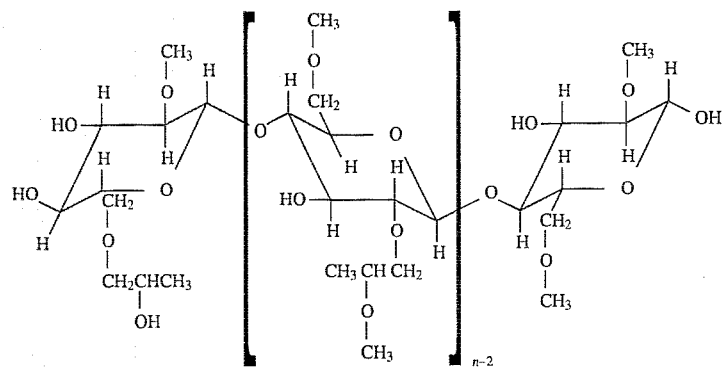

where n represents the total number of rings and is any integer that satisfies the molecular weight range and the hyperthermogelling component has a molecular weight range of about 1,000 to about 100,000.

32. The method of claim 14 having concentration of the hyperthermogelling component between about 0.05 % by weight and to about its critical concentration.

33. The ink composition of claim 1 in which the hyperthermogelling component includes a hydrophobic moiety and a hydrophilic moiety.

34. An aqueous ink composition, comprising:
a coloring agent;
a water dispersible polyester gloss agent; and
an ink colorant carrier composition.

35. The composition of claim 34 further comprising the water dispersible polyester gloss agent being selected one from the group consisting of a carboxylated polyester, a hydroxylated polyester, a phosphonated polyester, a sulphonated polyester or combinations thereof.

36. The composition of claim 34 further comprising the ink colorant carrier composition comprising an amount of hyperthermogelling component in a concentration such that the ink composition is in a liquid state at first temperature and is in a solid state at a second temperature where the second temperature is greater than the first temperature.

* * * * *